(12) United States Patent
Gritzman et al.

(10) Patent No.: US 8,281,253 B2
(45) Date of Patent: Oct. 2, 2012

(54) WINDOWING AND CONTROLLING SYSTEM THEREOF COMPRISING A COMPUTER DEVICE

(75) Inventors: Michael Gritzman, Oslo (NO); Arve Larsen, Oslo (NO); Thorstein Lunde, Oslo (NO)

(73) Assignee: Favourite Systems AS, Oslo (NO)

( * ) Notice: Subject to any disclaimer, the term of this patent is extended or adjusted under 35 U.S.C. 154(b) by 464 days.

(21) Appl. No.: 12/711,718

(22) Filed: Feb. 24, 2010

(65) Prior Publication Data

US 2010/0205560 A1    Aug. 12, 2010

Related U.S. Application Data

(63) Continuation-in-part of application No. 10/551,979, filed as application No. PCT/NO2004/000099 on Apr. 2, 2004, now abandoned.

(30) Foreign Application Priority Data

Apr. 8, 2003    (NO) .................................... 20031586

(51) Int. Cl.
G06F 3/048    (2006.01)
(52) U.S. Cl. ....................................... 715/788; 800/825
(58) Field of Classification Search .................. 715/788, 715/800, 825
See application file for complete search history.

(56) References Cited

U.S. PATENT DOCUMENTS

| | | | |
|---|---|---|---|
| 5,371,844 | A | 12/1994 | Andrew et al. |
| 5,487,143 | A | 1/1996 | Southgate |
| 5,574,908 | A | 11/1996 | Harding et al. |
| 5,666,498 | A | 9/1997 | Amro |
| 5,727,950 | A | 3/1998 | Cook et al. |
| 7,146,573 | B2 | 12/2006 | Brown et al. |
| 2001/0047626 | A1 | 12/2001 | Ohkado |
| 2003/0200263 | A1 | 10/2003 | Goldberg |

FOREIGN PATENT DOCUMENTS

| | | |
|---|---|---|
| JP | 5080967 | 4/1993 |
| JP | 6202842 | 7/1994 |
| WO | 0233576 A1 | 4/2002 |
| WO | 0237209 A2 | 5/2002 |
| WO | 03014905 A2 | 2/2003 |

OTHER PUBLICATIONS

Sep. 2, 2008 Office Action for related Appln. JP 2006-507892.

*Primary Examiner* — Andrey Belousov
(74) *Attorney, Agent, or Firm* — Volpe and Koenig, P.C.

(57) ABSTRACT

A method and a program system comprising a plurality of windows displayed as an evolving series of instances of said windows with different sizes is described. The content of said evolving series of instances of window sizes may be changed according to specific rules and a change is performed when a size is equal with at least one predefined reference size for a window. A preferred embodiment of the present invention provides a possibility to display and manage a plurality of windows comprising standard input and output windows as well as system indicators on a small computer screen such as used in mobile telephones or Personal Digital Assistants.

21 Claims, 14 Drawing Sheets

| Window Name | Relative Importance | Resource List | External Id |
|---|---|---|---|
| A | 0.1 | Image 1 Audio 4 | LL33 |
| B | 0.1 | Image 7 | PO4 |
| C | 0.6 | Image 2 Image 3 | |
| D | 1 | Image 1 | 445 |

WINDOWING AND CONTROLLING SYSTEM THEREOF COMPRISING A COMPUTER DEVICE

CROSS REFERENCE TO RELATED APPLICATIONS

This application is a continuation-in-part of U.S. patent application Ser. No. 10/551,979, filed Oct. 5, 2005, which is a 371 National Phase Application of International Application No. PCT/NO2004/000099 filed Apr. 2, 2004, which are incorporated by reference as if fully set forth.

FIELD OF INVENTION

The present invention relates to a windowing system for computer devices communicating with a screen or a public information board, and more particularly to a windowing and controlling system thereof providing presentation and interaction of large quantities of information on a small screen or on a limited part of a screen, for example a personal digital assistant (PDA), cellular phone, a toy, a clock.

BACKGROUND

Interactive windowing systems are well known and used in most types of prior art computer devices that are connected to a screen. A windowing system provides the user with easy means to perceive overview and interact with information, applications and services available in the computer device or through a computer network connected to the device.

The human ability to correctly interpret graphical information is highly connected to the size, resolution or recognition of typical graphical properties of the information. These limits become particularly evident on small sized screens. This restricts the ability to display large amount of information simultaneously on such screens. A common solution in the prior art is to split the information into suitable segments, displaying the segments sequentially or side by side in a window. A common property of such system is the scrollbar allowing the user to scroll the window horizontally and vertically providing viewing of all the information comprised in the window.

The main group of computer devices connected to small screens are cellular phones, including phones with extended data functionality, smart phones. Another large group of devices are personal digital assistants (PDA), integrated with cellular phones sometimes. A last group of devices contains other devices such as embedded systems, toys, clocks, jewelry etc.

The prior art presentation and interaction schemes for small screens, connected to cellular phones or similar devices, are mainly based on three different approaches:
1. Each task occupies the entire screen, and elements of information are displayed one at a time. For example, reading or typing an SMS (Short messaging system) message, using a web browser or playing a game.
2. Another prior art solution is to allow several indicators to be displayed simultaneously, providing continuous updates of the state of selected processes. For example, indicators in cellular phones indicating battery charging levels and signal strengths.
3. A hierarchical menu system is normally used to allow the user to navigate and select among the different actions and choices to be made in a cellular phone. The menus are navigated by means of arrow keys or other designated keys. Sometimes the menu system is displayed as a two-dimensional grid of icons, allowing the user to navigate four ways rather than two ways. For such systems it is common to use sensors in the screen sensing geometrical location information from a force applied at a certain point on the screen, for example by pushing a stylus on the screen, thereby allowing the selection of an icon or a menu. PDAs normally come equipped with a stylus (a pen-formed artefact) to push or draw on the surface of the screen.

Existing windowing systems provides textual input normally by selecting a window and often a window component such as a text box, a dropdown list, a check box etc. to receive the input, for example from an attached keyboard to the computer device. When a component is selected the user can enter text or other input through said keyboard, a mouse, a stylus, a soft keyboard etc. connected to the computer device, where the text is displayed in the selected component.

In mobile phones, the prior art technique typically either use the techniques described for windowing systems above, or they display only a component that can receive input one at a time, sending any input to that component.

The approaches described above limits the numbers of applications a user can activate to one at a time. It is also difficult for a user to add new graphical icons or new indicators to the device. Further, it is not possible to prioritise indictors, allowing more interesting events to be signalled more clearly than less interesting events.

Another problem with indicators and menu systems in the prior art is that items is only displayed in two meaningful sizes, the symbol as a menu item or icon size and the full screen size. The window itself can often be scaled, but very few applications adapt to the scaling and display meaningful information in scaled windows. The normal scheme is to let the edges of the window cut the information to be displayed, leaving some information still visible while other information is hidden. Normally, a scrollbar is displayed and arranged to allow the user to scroll between the different sections of information. The solution makes it difficult to get a view of the total state of the system and to identify what is currently the most important element.

Another problem with the prior art solutions, which also is present when using touch sensitive screens, is the large number of menu items, resulting in a large menu hierarchy, which can be hard to navigate for the user. A large hierarchy of menus also forces the user to perform several actions to activate an application or to change the state of the system. It further becomes difficult to overview the set of possible actions and choices to be made.

Another problem with the prior art solutions is the need to select a specific component to receive input. If input is to be entered into several components, the user must either select one by one of several visible receiving elements, or step forward and backwards between elements if only one is displayed at a time. The user is forced to spend time finding and selecting the correct components for the input, and makes it hard for the user to keep an overview of the total of input given. Furthermore it forces the user to select the correct component to receive the input before giving the input itself, forcing the user to remember the input until the component is selected.

Another problem with prior art is that it attempts to give each window as much of the available screen space as possible. In this way, the screen is always full of windows, even if there is no important information to convey to the user.

Another problem with prior art is the limited functionality of the sizing and placement mechanisms. Windows are normally placed in a simple geometric pattern, giving no or limited support for user placement of windows, windows not being rectangle or windows with different geometric shapes.

Another problem with prior art with automatic window placement is that windows placed by the user is later moved by the windowing system. As a result it is often difficult for the user to find the window.

Several systems has been developed trying to overcome the shortcomings in the prior art. One such system is the GetRight application from Headlight Software. GetRight is a file downloading tool, and is able to display itself meaningfully as a window, as a part of the task bar in a Microsoft Windows System and as an indicator on the screen.

The patent application WO 02/37209 by Affymetrix Inc describes the hardware and software for a user interface where windows are coupled to each other. The user interface is especially suitable for graphically displaying the data from analysis of biological samples.

The patent application WO 02/33576 by Park describes a method and an apparatus to produce a divided object window for a internet connected device or terminal, especially suitable for e-mail, internet advertising and similar applications, controlled by environment parameters for the object window as well as pre stored information about the window from one or several databases.

The patent application WO 03/014905 by Danger Research Inc describes a method and a system for a computer screen, focussing on user interaction regarding Instant Messaging (IM), (ICQ) messaging systems and similar messaging systems. By using this system several IM messages can be displayed and controlled simultaneously by the user through starting a first IM window where other messages are displayed as indicators.

The patent application US 2001/0047626 A1 by Akira Ohkado describes a method for controlling a window in a windowing system. By using the method, the size of windows is changed from a first size to a second size on the basis of the information contained in the window.

The U.S. Pat. No. 5,666,498 by International Business Machines Corporation describes a system and a method for automatic arrangement of windows in a display apparatus. The method includes a managing and calculating method to arrange windows making it easier to select an active window.

SUMMARY

The object of the present invention is to provide presentation and manipulation of a large set of applications and services simultaneously by a windowing and controlling system thereof comprising a computer device communicating with a small screen, or a limited area of a larger screen.

In an example of embodiment of the present invention, windows on a computer screen are resized through a plurality of displayed sizes. The plurality of displayed window sizes comprises a set of at least one reference size used such that the content and/or the appearance of the content of the current displayed window is changed and displayed according to specified rules when the current window is resized to this at least one size comprised in said set of reference sizes.

In another example of embodiment of the present invention, the size of a window is used to reflect importance of windows. The largest of the displayed windows is the window with highest importance; the second largest window is the second most important etc. The importance of a window is set by a system routine or by user interaction in said window. The importance of a window is used to display a status of the content of the window, such as a process status, service status or more generally a change of information status etc.

In another example of embodiment of the present invention, the importance of a window is also signalled through the colour of the window.

In another example of embodiment of the present invention, the user can manipulate windows and their connected applications or services, including starting, stopping, hiding, displaying, enlarging, shrinking, deleting, placing etc. the windows and applications and/or services through an input apparatus connected to the computing device.

In another example of embodiment of the present invention, windows with graphical information are displayed in all its displayable sizes indicating a state of the application or service.

In another example of embodiment of the present invention, the graphical information of a window indicates a state of the application or service connected to the window. (The information is displayed in all displayable window sizes.)

In another example of embodiment of the present invention, the windowing system receives input entered from an input device connected directly to the computer device or through a network. When input is received, the windowing system sends the input to a selected window. If no window is selected or the selected window will not accept the input, a new window is created by the windowing system displaying the input received in said new window.

In another example of embodiment of the present invention, information, data and parameters can be provided to an application via at least one window comprising such information, data and parameters, where said information, data and parameter window may be dragged and dropped on to the window corresponding to the application, regardless of the size of said windows.

In another example of embodiment of the present invention, graphical elements displayed in windows or as part of a visual appearance of windows corresponding to an application or service, may be obtained from a remote computer device and downloaded through a network.

DETAILED DESCRIPTION OF THE PREFERRED EMBODIMENTS

Figure 1:
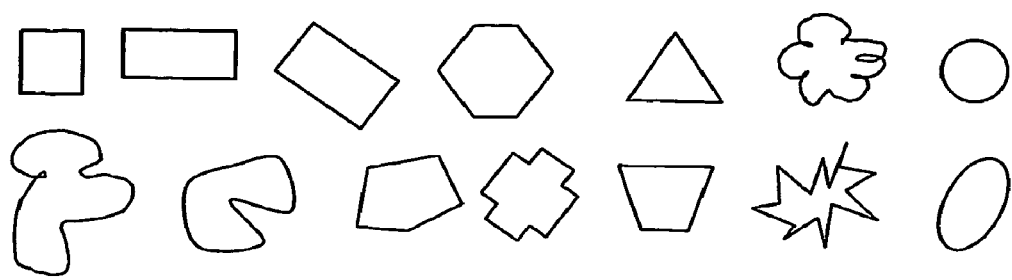
FIG. 1 depicts examples of some possible basic forms of windows, according to an example of embodiment of the present invention.

As shown in FIG. 1, different windows according to the present invention may have different basic forms. A window keeps its basic form displayed in all its sizes.

In an example of embodiment of the present invention, the windows are seen as bubbles in a tub of soapy water seen from above. In an example of embodiment on a PDA, a stylus is used to stir. From the start, the screen is empty, showing no windows. When the stylus is used to stir the water, i.e. touching the screen, soap bubbles are created as if done in a real tub of soapy water. The created bubbles rise from the bottom towards the surface of the tub, i.e. perpendicular to the screen surface. While rising, the size of the bubbles is increasing. This example of visualisation of windows, based on the concept of bubbles, gives a strong cognitive support for the use of this example of embodiment of the present invention, making interaction, behaviour and necessary actions predictable and self explanatory to the user of the system.

In another example of embodiment of the present invention, bubbles that have raised all the way up will start to sink. The size of the bubbles is decreasing while the bubble sinks; until it reaches bottom of the tub. In this simple manner, by using rising and sinking bubbles in varying sizes, the screen can display any set of windows contained by the windowing system even on a small screen or on a small part of a larger screen.

In an example of embodiment of the present invention, display module software (device driver) in the computer device is used to draw the windows onto the connected screen. The windows pending to be displayed, and the order in which they are displayed, is normally provided via a list of attributes that parameterizes the presentation on the screen of said windows.

In another example of embodiment of the present invention, an attribute in said list is used by the display module as a parameter setting a window's importance. Importance can for example be set relative to 1 by giving the most important window the value of 1 and other less important pictures fractions of 1. If the importance of a window is set to 0.7, the displayed size is 0.7 times the displayed size of the window when it has the importance set to 1.

Figure 2:
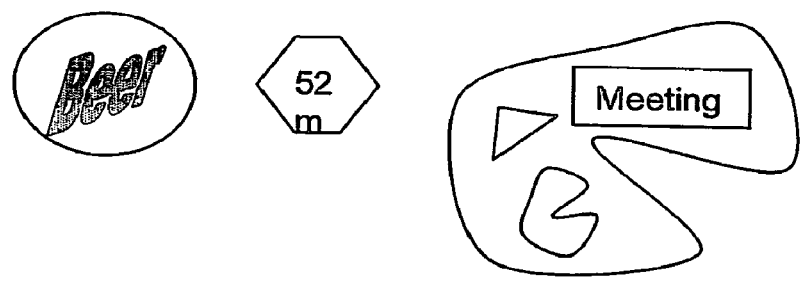
FIG. 2 illustrates examples of different windows comprising one or more graphical elements displaying different information according to an example of embodiment of the present invention.
Figure 3:
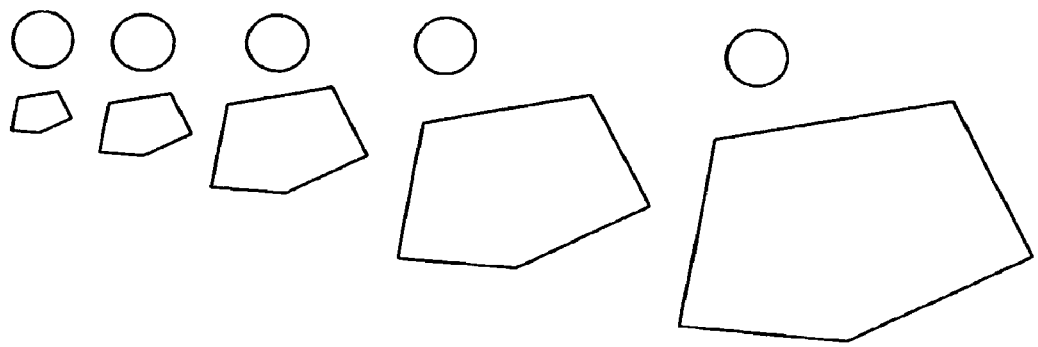
FIG. 3 illustrates how windows can vary in size including one window that represents a window with an importance, according to an example of embodiment of the present invention.
Figure 4:
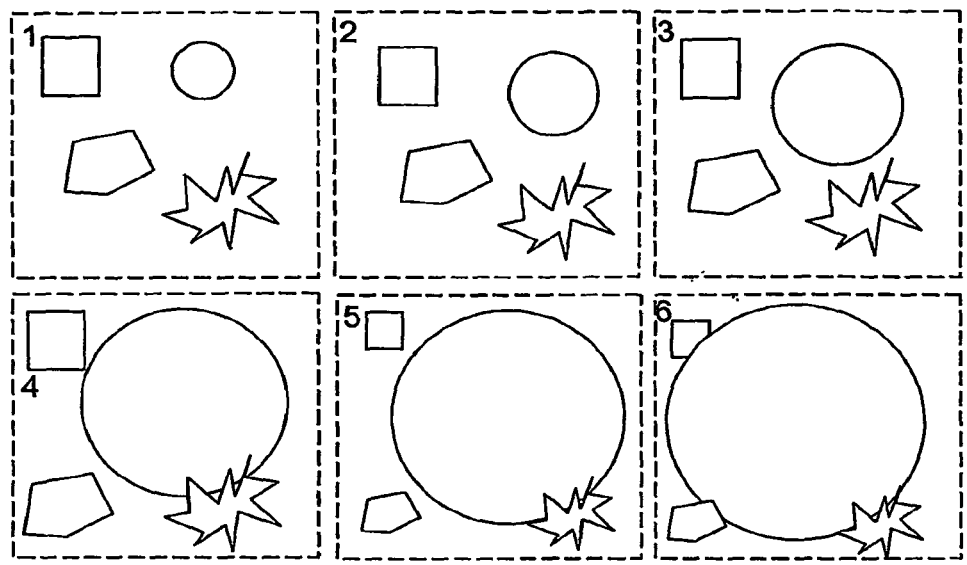
FIG. 4 illustrates how windows can be scaled down to a smaller size when needed, picture 1 to 5, and how increasing overlap can be obtained, picture 6.

FIG. 2 illustrates windows comprising different graphical elements. FIG. 3 illustrates how a window of higher importance than the other windows is displayed as a window of a larger size. FIG. 4 depicts an example of how windows can be scaled down according to the present invention.

In an example of embodiment of the present invention, the screen device is, via software and hardware known to a person skilled in the art, extracting the coordinates of a pressure point on the surface of the display provided by a stylus or other similar artefact. To perform an action, the user performs a gesture with the stylus or similar artefact on the surface of the screen displaying for example a bubble. The extracted coordinates identifies the selections done with the artefact.

In an example of embodiment of the present invention, a keyboard is connected to the computing device. Actions are performed by the user selecting for example a bubble to receive an action by the arrow keys on the keyboard, and then pressing keys to invoke the appropriate action.

In another example of embodiment of the present invention, the user can select for example a bubble using a suitable action while a bubble is rising towards the surface.

Figure 5:
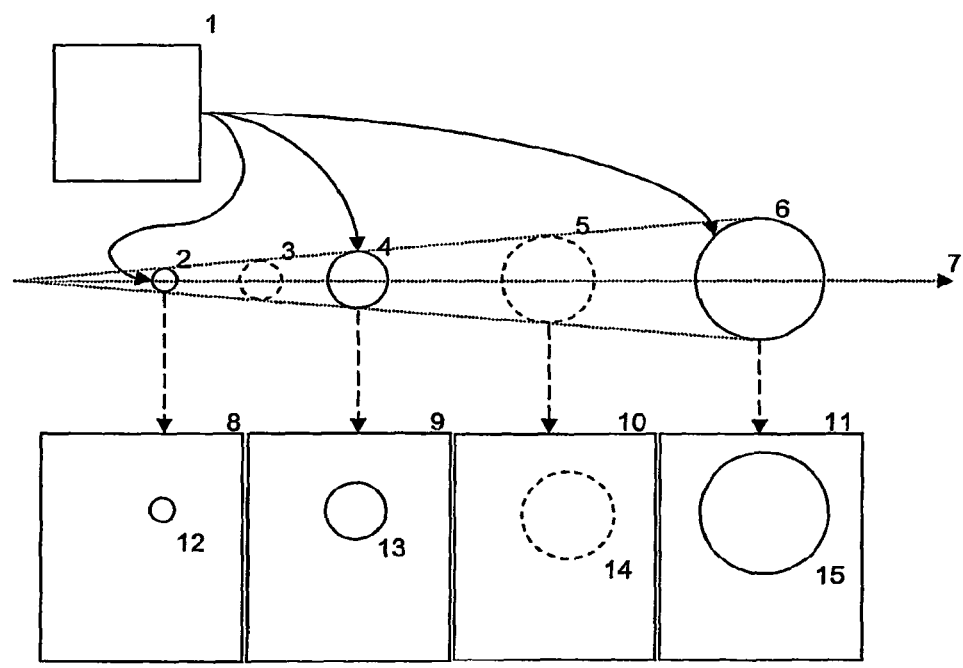
FIG. 5 illustrates how a window is scaled from its existing size to its target size, through a set of intermediate sizes, where some sizes are reference sizes, some sizes are invisible sizes and some sizes are displayable sizes, according to an example of embodiment of the present invention.

In a preferred embodiment of the windowing system according to the present invention, as illustrated in FIG. 5, a window is scaled through for example the sizes illustrated as 12, 13, 14 and 15. This is illustrated in FIG. 5 as an evolution along an axis 7. The axis may represent development of size of windows over time, but said evolution is not necessarily a continuous evolution. According to the present invention the evolution through the different sizes may be event driven. Events as such can be user interactions or system routine actions etc. In the present example, when a window increases or shrinks in size, it passes through all possible sizes, including the visual sizes depicted as 2, 3, 4, 5 and 6 in FIG. 5. At certain geometrical sizes, called reference sizes as for example 2, 4 and 6 in FIG. 5, the content comprised in the window and the graphical appearance of the content is changed according to rules set in the window (as a list of parameters, for example) for the reference size while the basic form of the window is preserved. The different appearances on the display are illustrated as 8, 9, 10 and 11 in FIG. 5. The dotted arrows pointing from window sizes 2, 4 and 6 towards corresponding screen images 8, 9, 11 illustrates the actions associated by the window passing through said corresponding reference size. Possible changes of said window, but not limited to, comprises:

Existing graphical elements in a window is provided new size and/or positions in said window.

Existing graphical elements are removed from said window.

Graphical elements from an element base (1) are added to said window.

In yet another example of embodiment of the present invention, the displaying of windows as depicted as an evolution of sizes as indicated in FIG. 5, is done in reverse order. That is, the displayed windows evolve shrinking in size opposite the direction indicated by the axis 7 in FIG. 5.

The actual displayed size of a window is defined as illustrated in FIG. 5 as an evolution of sizes, either as continuous evolution, up or down in sizes, or as an event driven evolution. However, the displayed physical appearance of a window on a display may be dependent on the pixel resolution of said display. If the resolution is not sufficient to exhibit the exact size of a window, the closest possible size is selected by a device driver as known to a person skilled in the art.

In a preferred example of embodiment of the present invention three reference sizes are provided, respectively defining a minimum size of a window, a maximum size, and an intermediate size of said window.

In another example of embodiment of the present invention, two reference sizes are provided, describing a window minimum size and maximum size, respectively.

Figure 7:
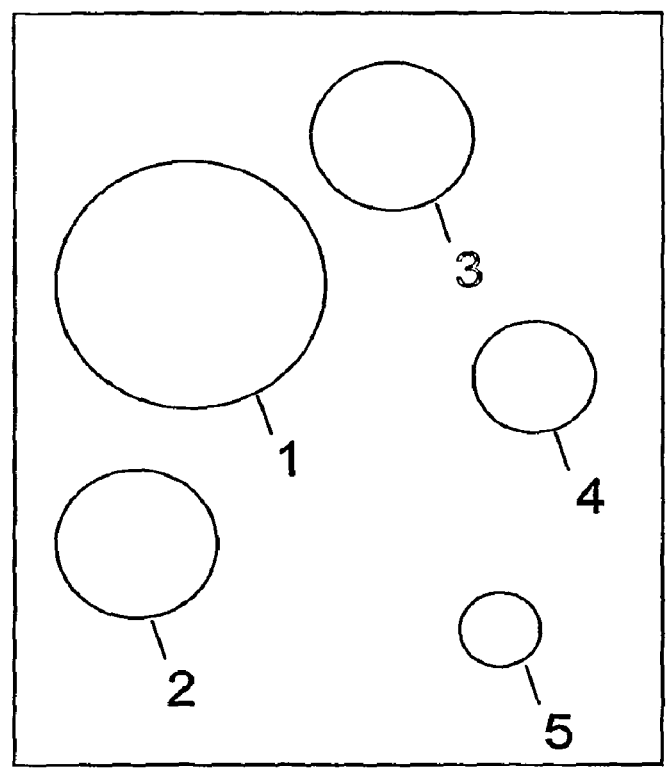
FIG. 7 illustrates how sizes of windows are used to represent their importance, according to an example of embodiment of the present invention.

Display module software according to the present invention draws windows sized relative to its importance. FIG. 7 illustrates an example of five windows with an importance from one to five. The importance is an attribute that can be set by the user. In an example of embodiment of the present invention attributes can be changed by the user by pointing at the window on a touch sensitive screen with the stylus performing a gesture, for example holding the stylus on the bubble for a minimum time, to select an edit function of said window. In another example of embodiment of the present invention, a menu is displayed with different actions associated with said window. One possible action is to set the importance of the window.

In another example of embodiment all windows are drawn with a size relative to its importance. FIG. 7 illustrates a display where all windows are drawn with a size relative to its importance and there are further display areas that are not used by any window. The total amount of display space used by all windows illustrates a total importance for all windows in the system. The display with its windows as a whole becomes an indicator for the total importance of the underlying system. If the display contains only small windows the system as a whole has no information of high importance to display. If the display contains several large windows, there are a lot of important information to display.

In an example of embodiment windows are drawn in positions on the display so they are not overlapping or overlapping in as little extent as possible.

In another example embodiment, if one or more windows have changed its size, position, has appeared or disappeared from the display all windows are checked if they are overlapping with any other window. For any two overlapping windows one window is pushed by the other window so that they are no longer overlapping. The process is repeated until there are no overlapping windows.

In one example of embodiment a, when the target position has been calculated, a new target position near the calculated position is selected at random to reduce risk of infinite loops.

In one embodiment a limit is set to all repetitions to avoid infinite loops. The limit can be a number of retries or a time limit.

In one example of embodiment each window is moved only once to avoid infinite loops. The limit can be a number of retries or a time limit.

In yet another embodiment, if said pushed window is pushed outside the display so it is not completely visible, the said pushed window is pushed away from the border and into the display until it becomes completely visible.

In one embodiment overlapping windows are pushed away from each other in a similar manner to colliding billiard balls. A direction is calculated from the centre point of the two windows. The pushed window is moved in the calculated direction until it is no longer overlapping the pushing window. If said pushed window is pushed outside the display so it is not completely visible, the said pushed window is pulled back towards the pushing window.

In another example of embodiment of the present invention a window can have a preferred position. The preferred position of a window is set when the window appears on the screen or if the user moves the window to a new position. The preferred position is not changed when the system moves a window. If the system moves a window away from its preferred position the window will move back towards its preferred position when possible, in other words when a screen area large enough for the window has been freed closer to the preferred position.

Figure 6:
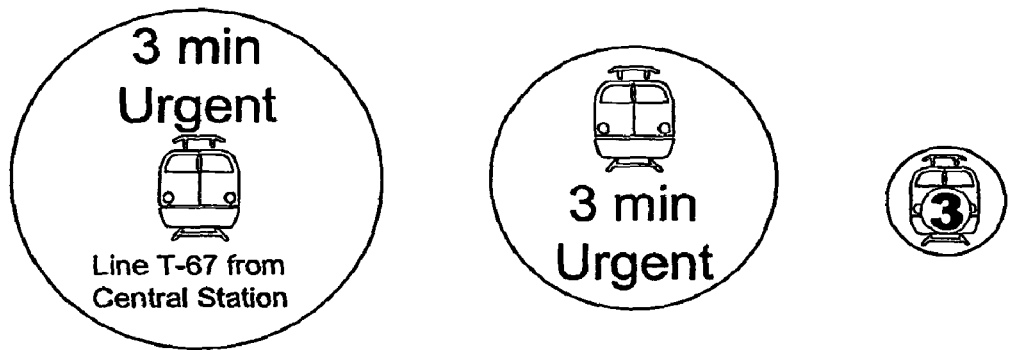
FIG. 6 depicts a window for an application displaying a tram schedule. The window is shown in three different sizes, each being based on different reference size of the window, according to an example of embodiment of the present invention.

In another example of embodiment, the computer device itself sets the importance. In the example illustrated in FIG. 6, it is natural for said computer device to provide a largest importance to a window depicting tram schedules for a station when there is minimal time left before said tram leaves said specified tram station. In this example of embodiment, it is the clock that is regulating the importance property. When the time comes into being, when the window has its largest importance, it is displayed in its largest size proportional to its importance.

In another example of embodiment of the present invention, input from an input device received by the windowing system is sent to an active window. An active window is a window that a user recently has selected, for example with an artefact on a display of a PDA. An active window may also be a window recently set up by the windowing and controlling system thereof according to the present invention. Said window provides the text to an algorithm receiving text provided specifically for this window. The algorithm may be as simple as just outputting and displaying the typed text in said window. Other examples of algorithms may perform an interpretation or parsing of text as known to a person skilled in the art of the typed text, extracting interesting data to set parameters for a window for example, using the text to perform a search among choices connected to the window etc.

In another example of embodiment of the present invention, a new window is set up to receive typed text when input from an input device is received by the windowing system. In this manner typed text can be kept by the system without being communicated to any specific application. The typed text may be kept for example as a "sticky note". Another possible use of such texts is to set parameters in another window by dragging the typed text window into that receiving window.

In a preferred embodiment, the execution of software modules comprising the windowing and controlling system thereof according to the present invention is based on two main parts: A runtime system that handles the dynamics and the processing of the execution of said software modules and a service framework that is a collection of objects that are the core of all services in the system.

Figures 8, 9:
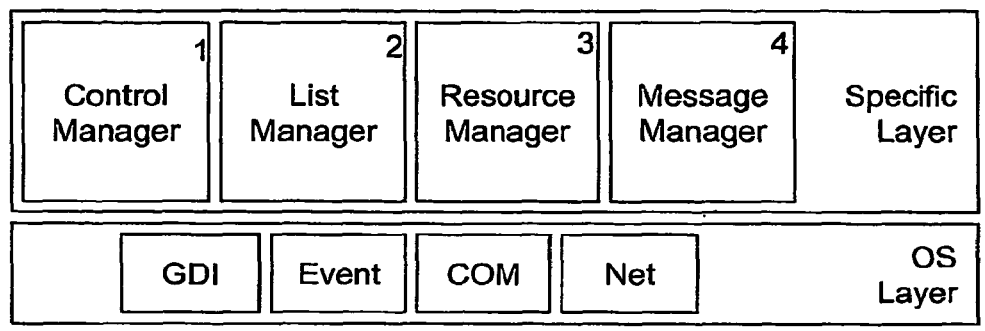
FIG. 8 is a block diagram of the main program modules in accordance with an example of embodiment of the present invention.
FIG. 9 depicts an example of a list of windows in accordance with an example of embodiment of the present invention.

FIG. 8 illustrates the main components of the runtime system. The execution of the system in FIG. 8 utilizes the already present services in an operating system of a computer device as known to a person skilled in the art. The most important such services are a graphical device interface (GDI), "events connected to inputs" service (Event), communication with other processes and systems components (COM) and network communication (NET).

Based on the basic services, a layer of support services is provided. The support services can be categorized as follows:

Management of drawing, placement, size and importance of windows, Control Manager 1.

Management of lists of application, List Manager 2.

Management of resources such as graphics resources etc. Resource Manager 3.

Management of messages to and from networks, including delivery to right application based on said applications address, Message Manager 4.

The control manager 1 uses a list 2 of current windows to decide size, placements etc. of said current windows on a display. The list 2 comprises references to windows and related data, including their importance. An example of list content is illustrated in FIG. 9. Each window has an internal identifier (Window Name), its importance defined as a relative number (Relative Importance) and a list of needed resources (Resource List). Resources are referred by name, and the resource manager is responsible for managing the resources such as locating them, including downloading them if necessary, allocate and free memory locations in the computer device running the windowing and controlling system thereof etc. The list may also comprise reference to objects (files) comprising graphical elements used by the windowing system. Such images can be bit-map based graphics, vector based graphics or a combination of both. Such graphical elements may be downloaded from a remote computer system via a network. A display module (not shown) can scale, enlarge and reduce such images as known to a person skilled in the art.

In addition to its basic information, a window according to the present invention can have an external identifier (External ID) used by for example the messaging service 4 in FIG. 8 when sending and receiving messages.

Figure 10:
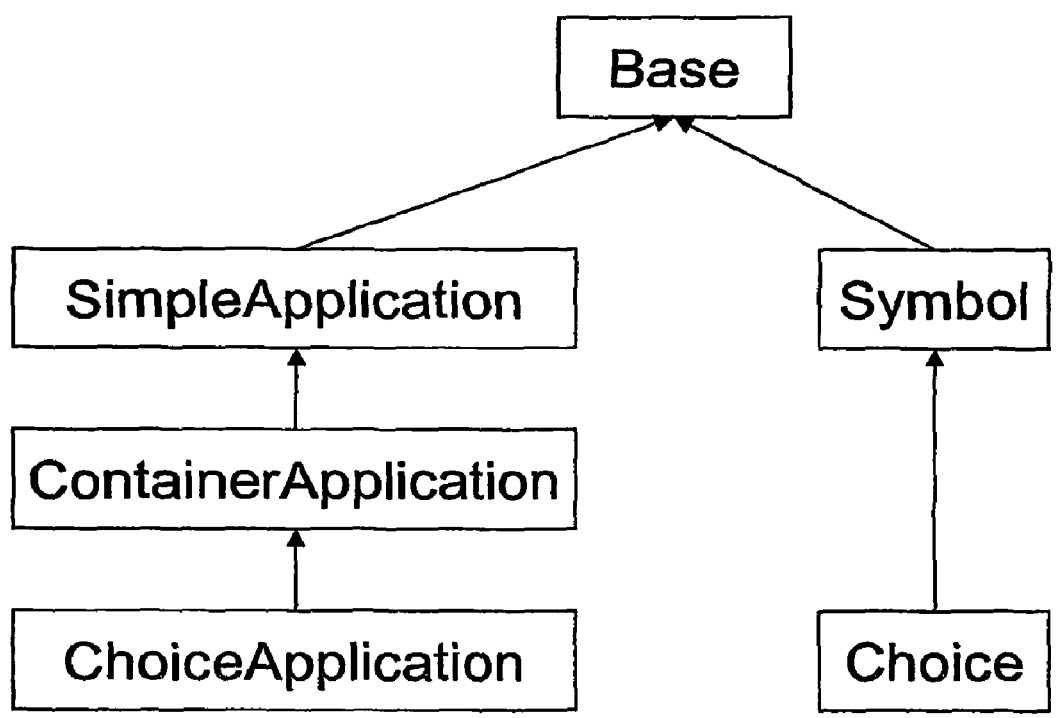
FIG. 10 illustrates an overview of the service framework in accordance with an example of embodiment of the present invention.

The main components of said service framework may be illustrated as in FIG. 10. The service framework is an object oriented structure, providing the basic functionality required of all services built in accordance with the present invention. The service framework contains the basic functionality needed by any service that is displaying a window in the windowing system. The different classes are described below.

All windows share a common base (Base). No instance of windows is built directly on the base, but on its different derivations. The most important methods and attributes are related to handling of:

importance
drawing of figure
management references to resources
scaling
Functionality for basic interaction.

The most basic windows act merely as graphical symbols and are based on the Symbol class (Symbol). A symbol comprises no private processing, and can be seen as a realisable version of the base class (Base).

Basic windows with own processing, such as basic services, are based on the SimpleApplication class. This class extends the base class with for example methods for:

Receive and send events, including addressing mechanisms.

Own processing.

Services that should be able to comprise other windows other than it own, is based on the ContainerApplication class.

The class extends its SimpleApplication with for example the following attributes and methods:

adding a window
removing a window
checking when adding or removing windows.
drawing the composite content Services that should be able to receive (for example by drag and drop actions) specific windows comprising information regarding said receiving window, for example to indicate special events or setting specific parameters, are based on the ChoiceApplication class. The class extends ContainerApplication with for example the following attributes and methods:

A set of possible choices, i.e. windows (Windows based on the Choice class) that can be added and/or removed in accordance with specified parameters, events etc.

List management and control unit for choices, allowing choices to be displayed and browsed by the user.

Figure 11:
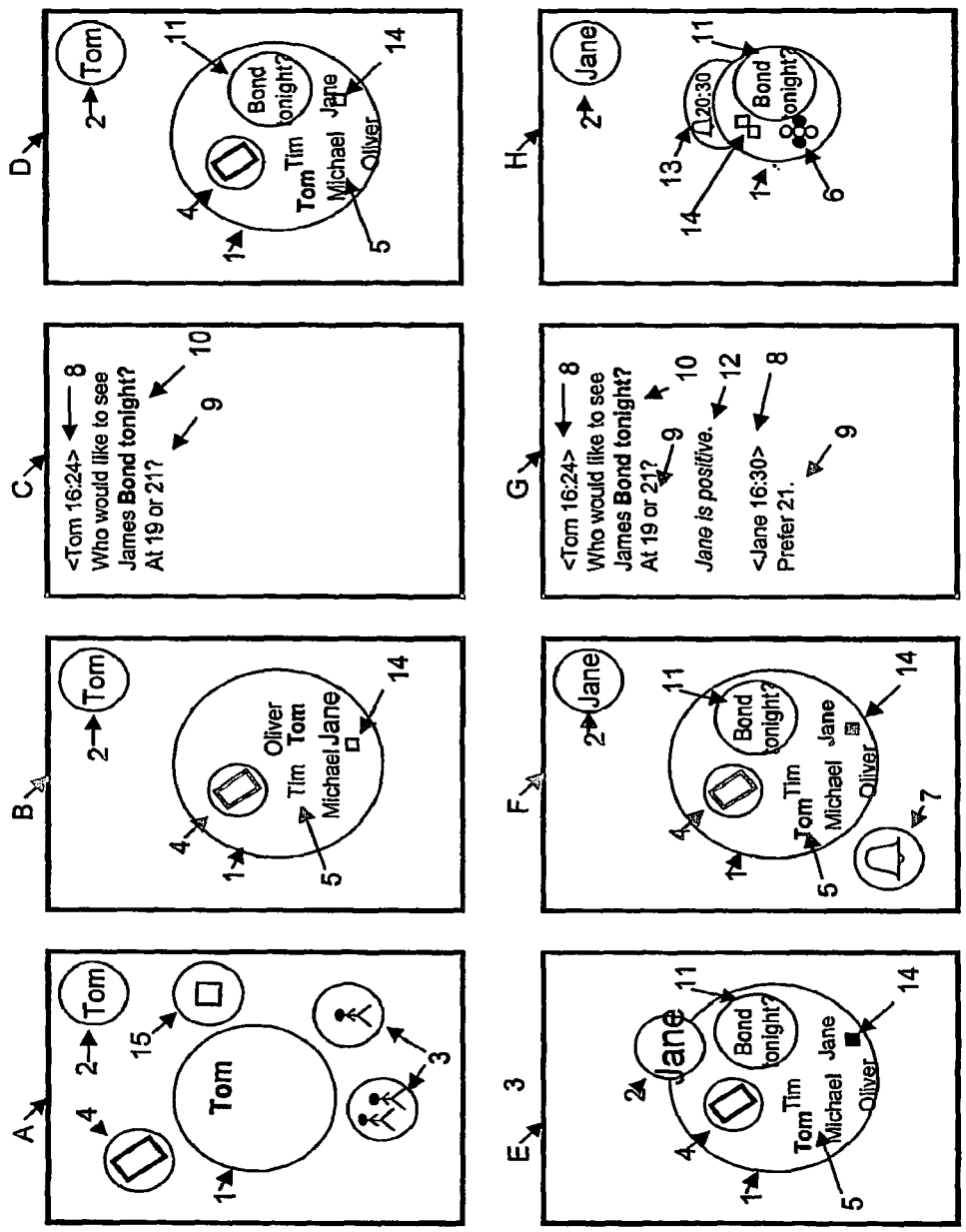
FIG. 11 illustrates an overview of the windowing and controlling system thereof when utilized in a chat session application, in accordance with an example of embodiment of the present invention.

The present invention may be used for many different applications and on different types of devices. A very special important application, when used in cellular phones or PDAs, is chat. FIG. 11 illustrates windows and actions provided as derived from a chat session by a group of friends planning to see a movie. Picture A, FIG. 11, illustrates how the windowing system is utilized in a chat. One participant, Tom initiates the chat. On his screen he has a window representing himself 2 as well as another window 4. The last windows can be any kind of window, for example a window with an image received from a friend, a service provider or taken by a camera attached to the computer device etc.

From the start, Tom's screen displays an empty chat only comprising himself as participant. In addition, the screen displays windows representing the persons and groups 3 that can be added to the chat, and other windows 15 that Tom often uses during his chats.

Tom selects a set of receivers by dragging the different windows representing receivers into the chat. The screen is continuously updated to display any changes as illustrated in B. Participants are displayed with names. The number of unread messages 14 in the chat is also displayed.

In addition to the window view of the chat, Tom can enter a standard full screen view for the same chat as shown in C. Tom writes a message 9, which is marked with his name and the current time 8. Tom can also mark one or several words so they will be visible in the window view 10.

When Jane receives the chat from Tom, as shown in E, she decides that she want to attend, i.e. see the film. She indicates this by dragging the window representing her 2 into the chat. This action is indicated graphically in the list of participants as shown in F, reference 5. In the full screen view of the chat, it is displayed as a system message as shown in G, reference 12.

When Jane starts interacting with the chat in F her screen displays the windows she is normally using when chatting, for example an alarm 7. She can also enter the full screen view of the chat as shown in G to write that she prefers to go to the cinema nine o'clock as shown in reference 9.

When Jane has finished her message, she makes the window view smaller as shown in H. As a result, some of the information is removed 4, some is kept 11, while other information, such as the names, is displayed but with another representation requiring less space (for example reference 5 is changed to reference 6).

Figure 12:
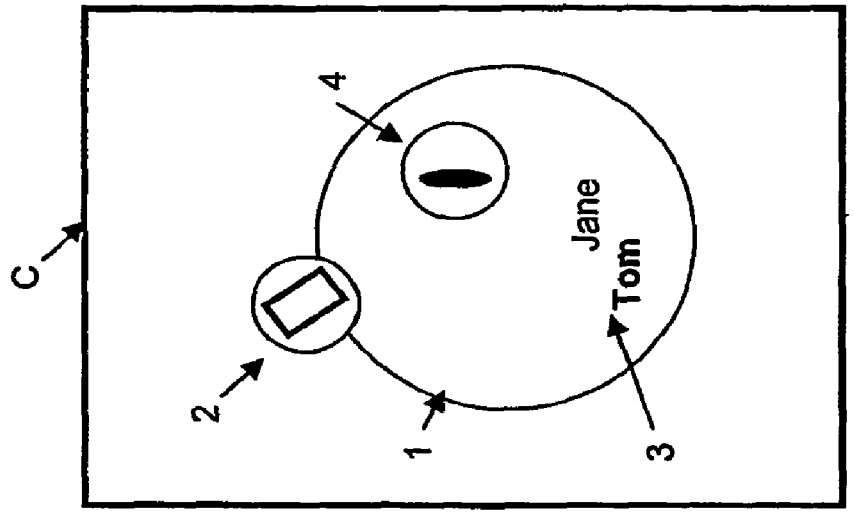
FIG. 12 depicts an example of a chat session based on graphical elements only, in accordance with an example of embodiment of the present invention.
Figure 12:
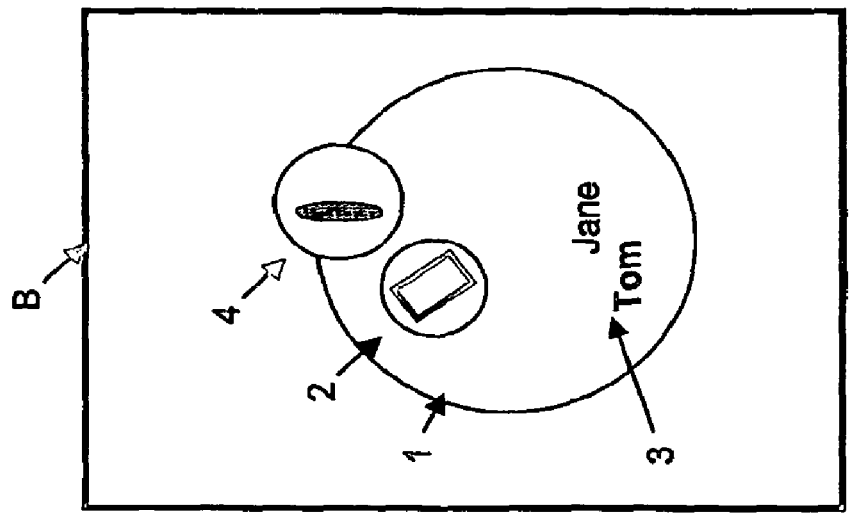
Figure 12:
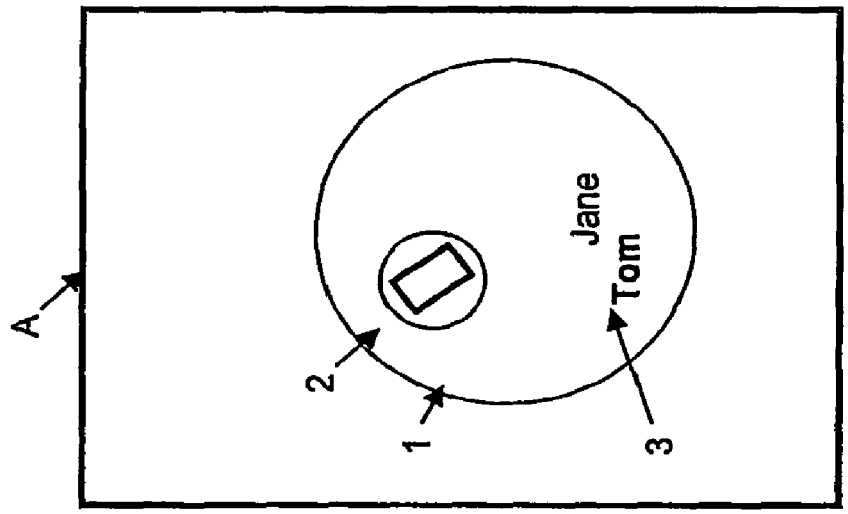

FIG. 12 illustrates how a chat can be performed directly in the window view. Tom takes the initiative as illustrated in A. He starts the chat 1, invites Jane 3 and adds the window 2 comprising some content that both of them can interpret. Jane answers as shown in B by adding a new window 4, as her contribution. Tom answers as shown in C by removing his window 2. This way, the dialog takes place in the window view. The full screen view is still available all the time.

Figure 13:
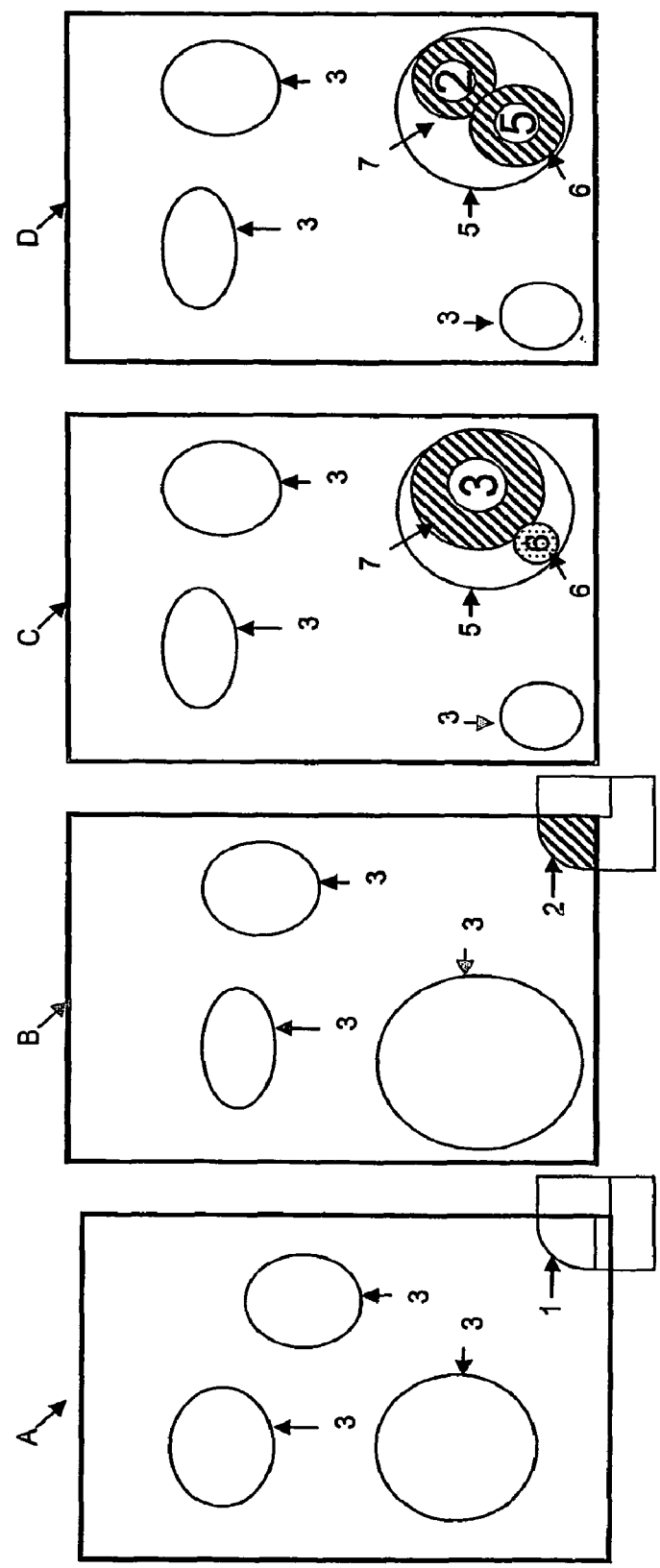
FIG. 13 depicts an example of signalling a state in a computer device, in accordance with an example of embodiment of the present invention.

FIG. 13 illustrates a situation where Tom has several windows 3 displayed on his screen, as shown in A. In addition, he has a window 1 indicating how much time is left to a certain event. This can for example be the time left before the next tram is leaving bringing him home from work.

Most of the day, the screen has only minor changes as shown in B. The window displaying the tram schedule changes its colour to indicate the time left before the next tram leaves, reference 2.

When the clock comes to being the normal departure time when Tom is leaving his work travelling for home, the tram window increases in size as indicated in 5 display C. Similarly, Tom can change the size of the window manually by performing a suitable action. As the window increases it also provides space for more detailed information, in this case showing that it is only a short time before the tram leaves 7, while an alternative bus is leaving somewhat later 6. The graphical element representing the tram is larger than the element representing the bus. The different sizes indicate that the user is in more haste if he plans to take the tram home, rather than the bus.

As the time evolves, the bus element shown in C starts to increase, and change colour. Since the window itself 5 does not become more important it does not change size. Rather than making the bus element larger, the tram element is made smaller to indicate that the tram and the bus now have the same importance.

Figure 14:
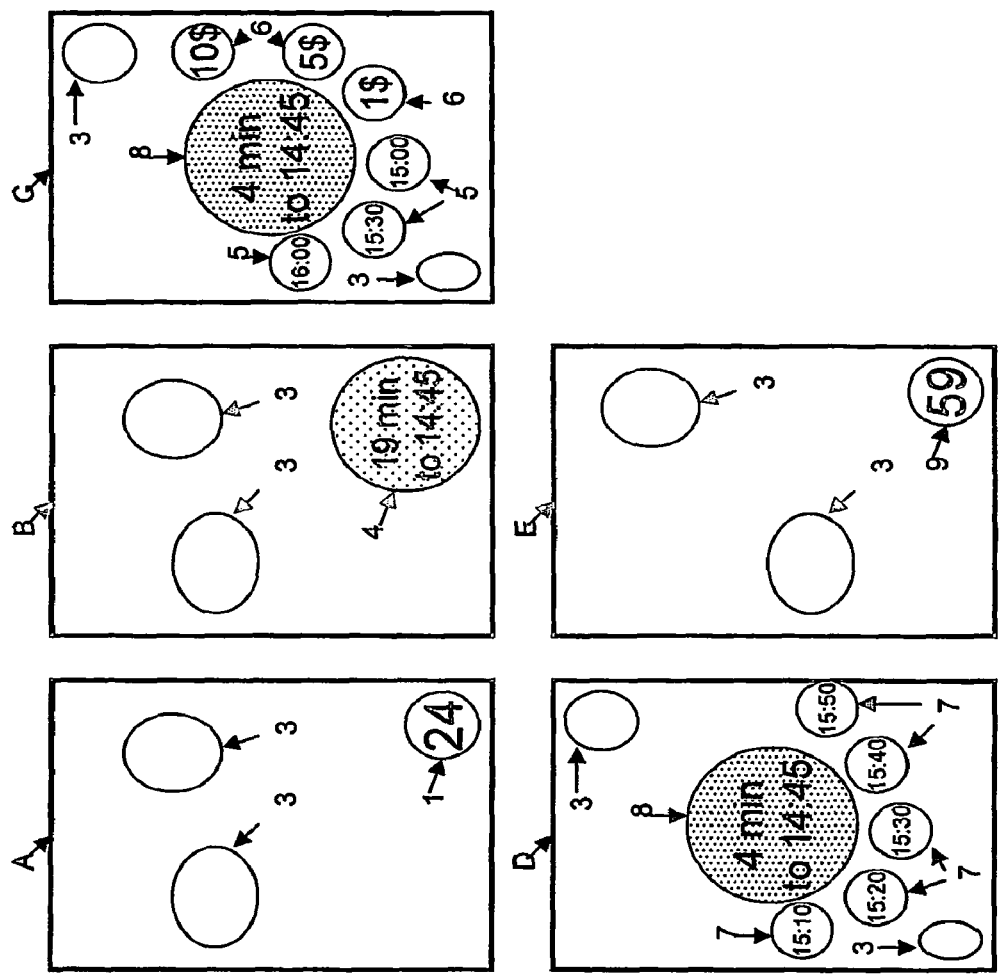
FIG. 14 illustrates an example on how the windowing and controlling system thereof can be used to pay for parking of a car for example, in accordance with an example of embodiment of the present invention.

FIG. 14 illustrates a service for paying and controlling the time left for a parking space. The example starts when the first payment is done as shown in A and there is 24 minutes left of the paid time 1. In addition, the user has several other windows 3 on the screen. As the time left becomes less, as shown in B and C, the figure increases and changes colour, reference 4 and 8. As the figure increase in size, there is also more space for additional information. If the user wants to pay to get additional time, he performs a suitable action on the window to make it display possible choices C. Possible choices can be to pay until a specified time 5 or a specific amount 6. In the example the user selects to pay until a specific time. The user performs an action on one of the time alternatives to see more time alternatives as shown in D reference 7. In the example the user chooses to pay until 15:40 by performing an action on the window containing the 15:40 text to add it to the parking window. When the user finishes the payment procedure, the window shrinks as shown in E, to illustrate that it is a long time before the parking time runs out.

Figure 15:
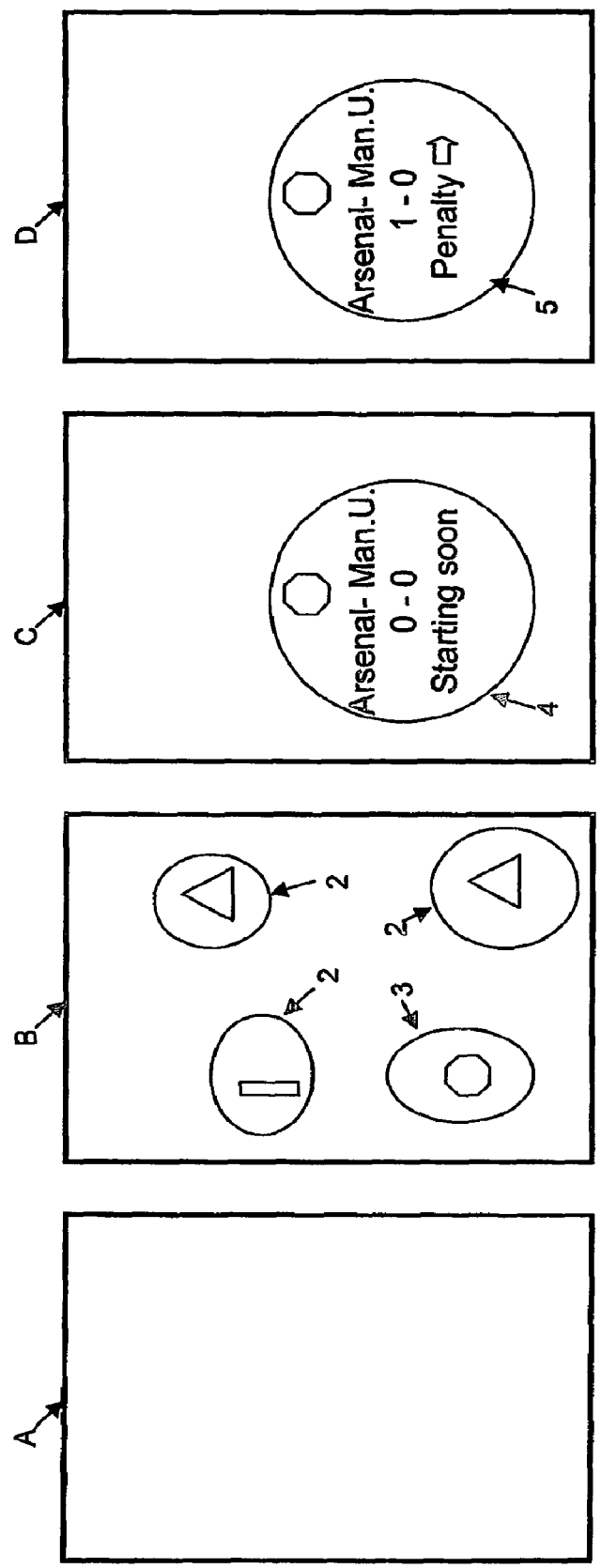
FIG. 15, depicts an example of how to find and use a window to help monitoring an event such as a football match, in accordance with an example of embodiment of the present invention.

FIG. 15 display A illustrates a screen with no visible windows. The user performs an action to make the computer device display possible windows as shown in B, 2, 3. The user is interested in one of these windows 3, and the other windows 2, disappears when the user selects the window of interest as shown in C. The window selected by the user is a window used to follow a football match 4. The window changes size and content dependent on events of interest in the match as shown in D reference 5.

Figure 16:
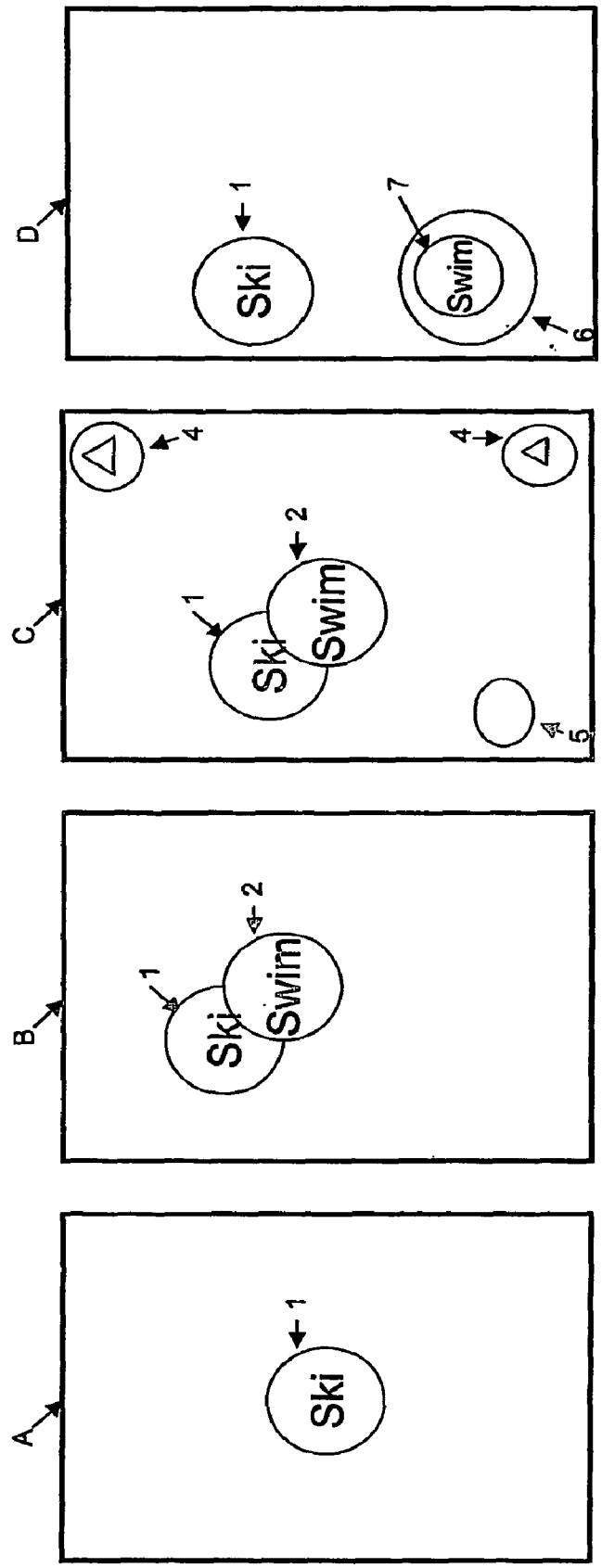
FIG. 16 illustrates the use of the windowing system when used for information services, in accordance with an example of embodiment of the present invention.

In FIG. 16 the user has a screen with no visible windows, as a new window is received from the network connected to the computer device. The window 1 displays information about skiing conditions nearby as shown in picture A. The user is interested in information about activities, but is not sure skiing is the right ting. The user performs an action on the window to get a new suggestion as shown in B, in this case swimming 2. The user decides that a trip to the pool is interesting but wants to invite some friends. The user performs an action displaying a selected set of all possible windows as shown in C, reference 4 and 5. The user selects the chat window 5 by dragging the swim window into the chat window as shown in C. The chat can proceed as in the example describing chat (see FIGS. 11 and 12).

Figure 17:
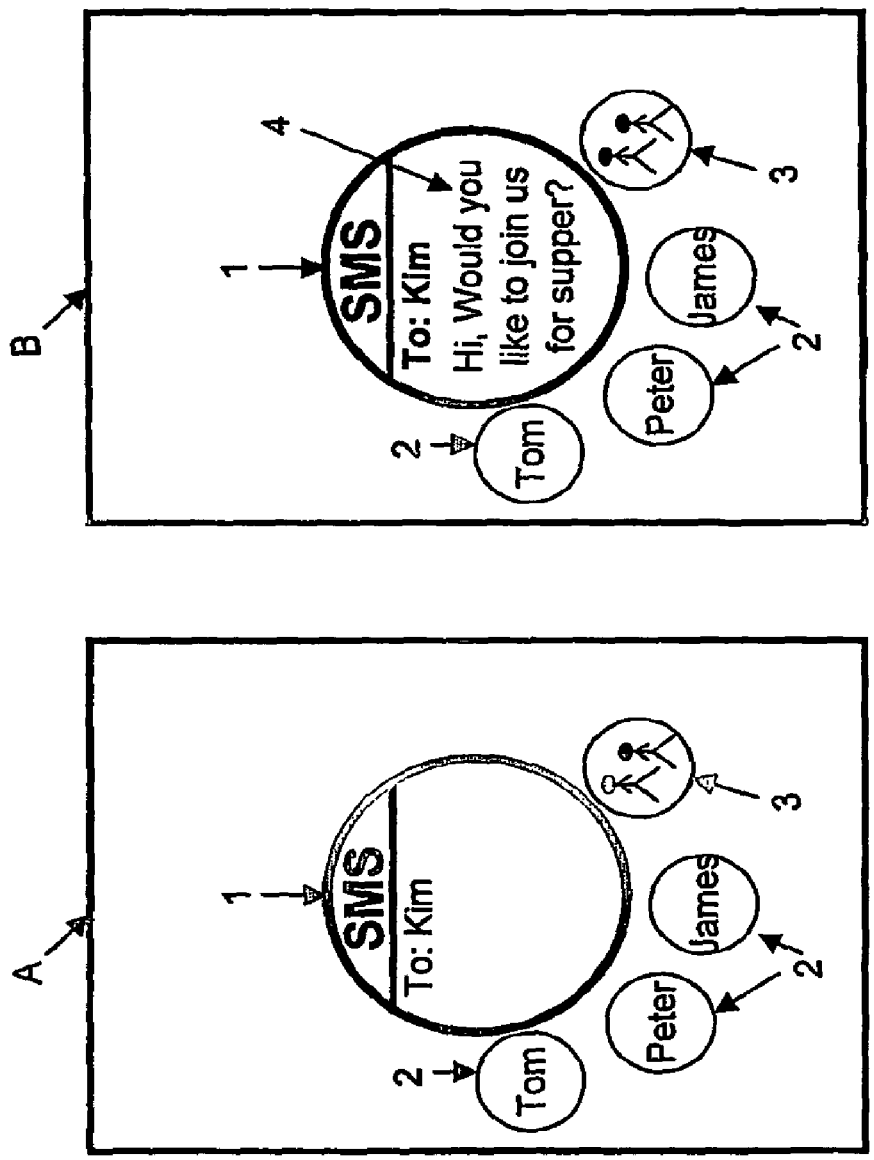
FIG. 17 illustrates how text is received and displayed by a window according to an example of embodiment of the present invention.

In display A of FIG. 17, an SMS window 1 is active, and has the receiver of the SMS set to Kim. Other possible receiver are shown 2, 3, and can be added by the user. As the user types the text, the text is received by the windowing system and directed to the SMS window. The text is interpreted to be the content of an SMS, and simply displayed 4 by the bubble, for example.

Figure 18:
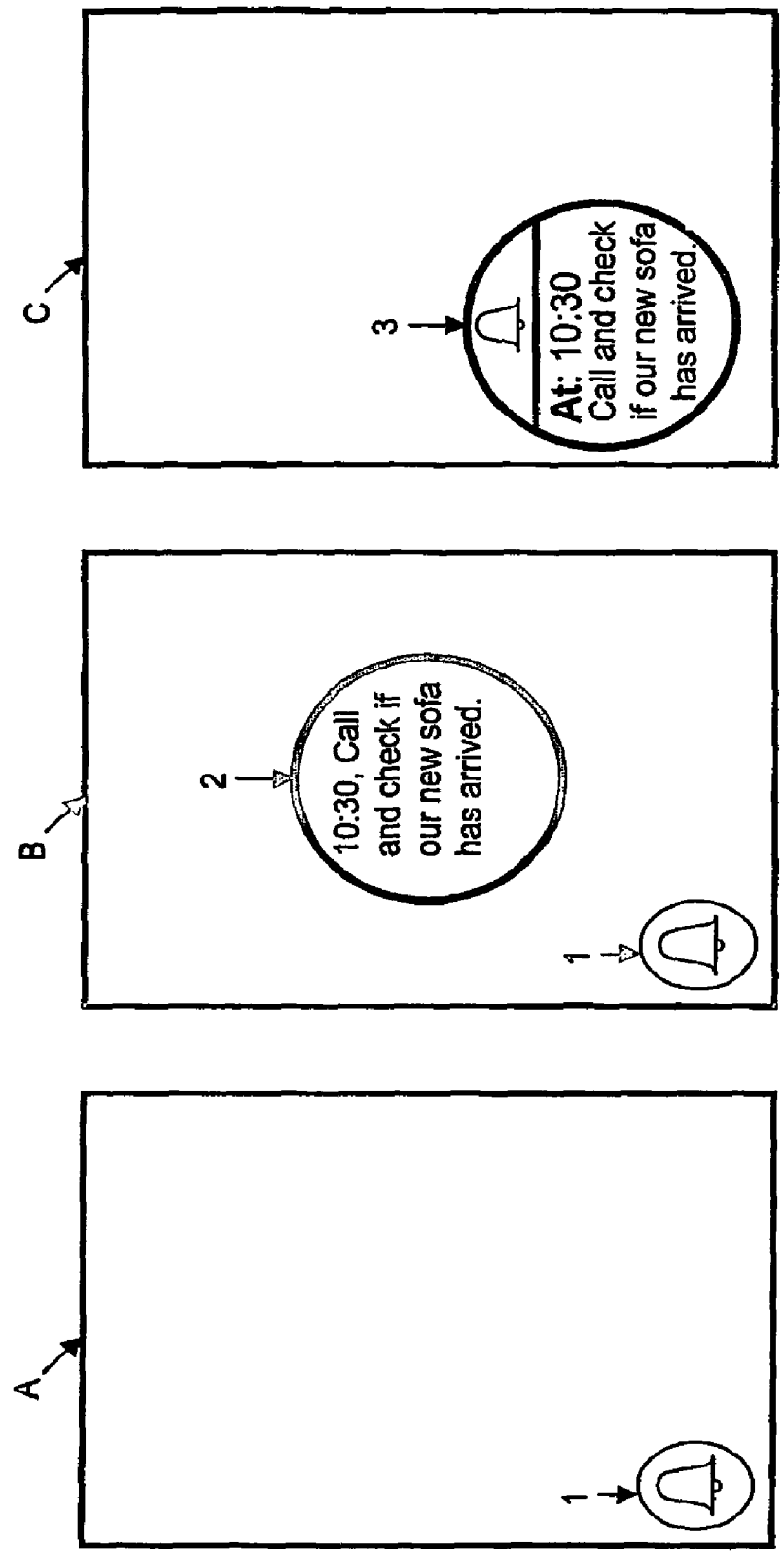
FIG. 18 depicts how a new window is created receiving input that later is dropped on an alarm window, according to an example of embodiment of the present invention.

In display A of FIG. 18, the user has no active windows. As the user starts typing the windowing system creates a new window to receive the input, picture B, 2. The user types some text, containing four digits at the start. The user drags and drop the text window 2 on to the alarm window 1, for example. The alarm window interprets the text and extracts the four digits as timing information, and sets the time parameter of the alarm window accordingly. The time for the alarm, and the rest of the text is displayed in the alarm window, picture C, 3.

Figure 19:
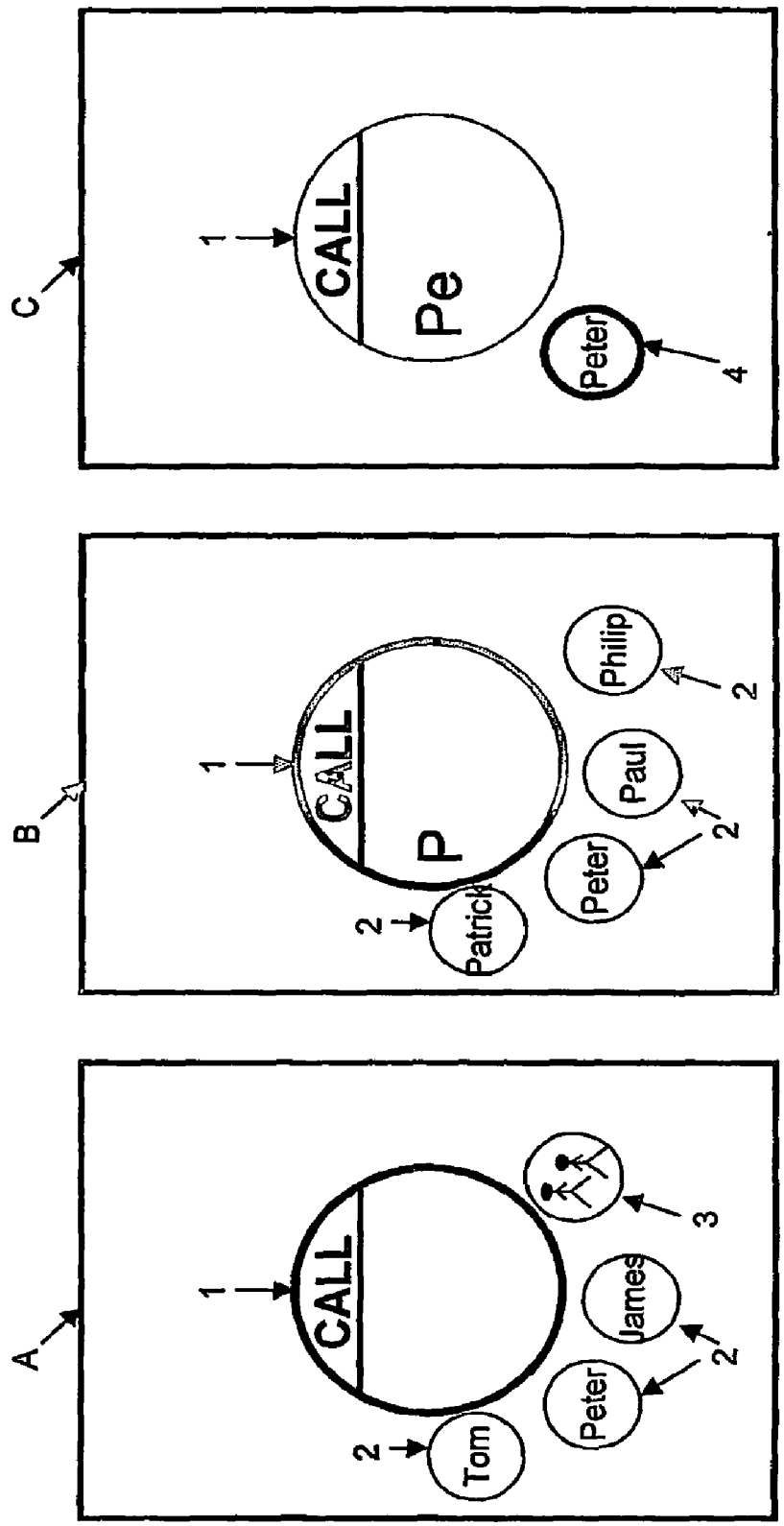
FIG. 19 depicts how input is used to initiate and refine a search in a call window (dial window) on a cellular phone, according to an example of embodiment of the present invention.

In display A of FIG. 19, the user has a call (dialling) window active 1. The most often used persons 2 and recent used lists 3 in the address book are displayed around the call window. To call on of the persons the user can perform a suitable action on the window of that person, but the user starts typing instead. As the user starts typing, the windowing systems send the text to the call window (active window). The call window displays the text and uses the text as search criteria. In B the user has typed P, and only persons having a name starting with P is displayed, still with the most often used persons first. Further typing refines the search C, when there is only one person left, the person is made the active bubble to make it easier to perform an action to call that person.

In another embodiment of the invention the connected input device may be the keyboard where each key has multiple interpretations, as in most cellular phones. When input from such a keyboard us used for searching, all the variants of interpretations are used to define the search criteria. The text displayed is the number of interpretations of the keys. When the set matching the search criteria is empty, the user can dial the number typed directly by performing a suitable action on the call window. The other search mechanisms are performed as described in the above embodiment.

Although the preferred embodiments of the present invention have been described in detail, it should be understood that various changes, substitutions and alternations can be made therein without departing from the spirit and scope of the present inventions as defined by the appended claims.

What is claimed is:

1. A method for windowing and controlling system thereof comprising interactive user interfaces for communication services and computer related applications on a computer device providing user interactions via windows on a display, wherein the method comprises the steps of:
   a) using a window for a specific interactive user interface application or service,
   b) selecting a starting predefined graphical appearance for the window representing the specific interactive user interface or service from a set of predefined windows of different sizes for windows,
   c) linking the selected starting predefined appearance of the window to at least one action related to the specific application of the interactive user interface or service provided for in this window, d) displaying instances of the selected starting predefined appearance of the window on the display as a series of evolving instances of the window when a user or an interactive user interface application or service using the windowing system initiates the displaying, wherein each respective displayed instance is from the set of predefined windows of different sizes, wherein the first instance in the displayed series comprises the selected starting predefined appearance for the window, e) continuing with steps a) to d) wherein step a) comprises selecting another window for another specific interactive user interface application or service, and continuing selecting other windows for other specific applications or services that are present in the computer device, f) windows being displayed in step e) being selected for use by user interactions or processes using the windowing system is kept on the display while the other non selected windows are shrinking in size until they disappear from the display or reach a predefined size, thereby maximizing available space on the display for the windows that has been selected.

2. The method according to claim 1, further comprising the step of retaining the selected predefined basic shape comprising the predefined graphical appearance of the starting instance of the evolving series of displayed instances throughout all the displayed instances of the window for a specific interactive user application or service.

3. The method according to claim 1, wherein the step of displaying the evolving series of displayed instances of a window for a specific application or service comprises displaying at least one instance with different shape or graphical appearance, respectively.

4. The method according to claim 1, wherein the step of linking the selected starting predefined graphical appearance for a window to a specific interactive user application or service further comprises using at least one parameter determining the graphical appearance of the displayed instances of the window.

5. The method according to claim 1, wherein the evolving series of displayed instances of a window for a specific application or service comprises three different displayed sizes of the instances, respectively.

6. The method according to claim 1, wherein the evolving series of displayed instances of a window for a specific application or service comprises two different displayed sizes of the instances, respectively.

7. The method according to claim 1, wherein the step of displaying the evolving series of instances of a window for a specific application or service may be interrupted by user actions or system actions, thereby causing the interrupted instance of the window to be resized and displayed in a larger predefined size.

8. The method according to claim 1, wherein the step of displaying the evolving series of instances of a window for a specific application or service may be interrupted by user actions or system actions, thereby causing the interrupted instance of the window to be resized and displayed in a smaller predefined size.

9. The method according to claim 1, wherein the step of displaying the evolving series of instances of a window for a specific application or service further comprises controlling the displaying according to a parameter defining an importance parameter for the window.

10. The method according to claim 9, wherein the importance parameter is a number between zero and one, one being the highest importance.

11. The method according to claim 10, wherein the importance parameter of a window for a specific application or service is used to scale a size of an instance of the window proportional to the value of the importance parameter.

12. The method according to claim 1, wherein the step of displaying the series of evolving instances comprises displaying at least one graphical image representing a state of a communication service or a computer related application running in the computer device in all the instances of the respective windows for the communication service and the computer related application.

13. The method according to claim 1, wherein the step of displaying the series of evolving instances of windows further comprises:

providing a parameter indicating a state of an application or a service running in the computer device, arranging at least one window as a window representing the state of the application or service, modifying the size of the at least one arranged window, or modifying a location for displaying the at least one arranged window, respectively, on the display in accordance with a value of the parameter indicating the state of the application or service.

14. The method according to claim 1, further comprising the steps of:

arranging at first window as an user interface to an application or service running in the computer device, capturing a value in a second window for a parameter related to the application or service in the first window, dragging and dropping the second window onto the first window thereby transferring the value to the parameter related to the application and service running in the first window via the user interface.

15. The method according to claim 1, further comprising the steps of:

arranging at least one window as an user interface for an application or service, reading or mirroring a value for at least one parameter for the application or service via the user interface;

displaying a content comprised in the series of evolving instances for the at least one window, wherein the content is changed as a function of the value of the at least one parameter and the size of the instance of the at least one window being displayed.

16. The method according to claim 1, wherein the step of selecting a basic geometrical shape and graphical appearance for a window for a specific interactive user application or service is provided for in a remote computer device or system, and then downloaded as needed via a network in communication with the computer device.

17. The method according to claim 1, further comprising the steps of:

receiving input from an input device such as a keyboard, a mouse, a stylus or artifact, a soft keyboard in communication with the computer device either directly connected to the computer device, or via a network in communication with the computer device, transferring the input via a user interface arranged in at least one window for an application or service in the computer device, wherein the window is activated by the application, user interaction with the computer device, or service, or actions in the computer device, if the recently activated window is not provided for to receive input, provide another new window enabling receiving input, displaying the input in the activated window.

18. The method according to claim 17, wherein the step of receiving input in the activated window comprises activating a parsing application for received text in the activated window.

19. The method according to claim 18, wherein the activating of the parsing is provided for by dragging and dropping the window receiving the input on to another window comprising the parsing application.

20. The method according to claim 1, wherein the step of displaying the evolving instances of a window for a specific application or service comprises starting the displaying when touching or stroking a surface of the display with an artifact, or a finger.

21. A computer device comprising a display system providing interactive user communications between users of the computer device and interactive user interface applications and communication services provided for in the computer device, wherein the computer device comprises a memory comprising computer instructions that when executed performs a method according to any claim 1.

* * * * *